(12) United States Patent
Xu et al.

(10) Patent No.: US 12,022,573 B2
(45) Date of Patent: Jun. 25, 2024

(54) SPLIT BEARER COMMUNICATIONS

(71) Applicant: Apple Inc., Cupertino, CA (US)

(72) Inventors: Fangli Xu, Beijing (CN); Dawei Zhang, Saratoga, CA (US); Deepankar Bhattacharjee, Milpitas, CA (US); Haijing Hu, Cupertino, CA (US); Lele Cui, Beijing (CN); Lijie Zhang, Beijing (CN); Qiang Miao, Beijing (CN); Zhiwei Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 385 days.

(21) Appl. No.: 17/438,996

(22) PCT Filed: Oct. 15, 2020

(86) PCT No.: PCT/CN2020/121077
§ 371 (c)(1),
(2) Date: Sep. 14, 2021

(87) PCT Pub. No.: WO2022/077319
PCT Pub. Date: Apr. 21, 2022

(65) Prior Publication Data
US 2022/0322078 A1    Oct. 6, 2022

(51) Int. Cl.
*H04W 8/30* (2009.01)
*H04W 76/15* (2018.01)
*H04W 76/19* (2018.01)

(52) U.S. Cl.
CPC ............. *H04W 8/30* (2013.01); *H04W 76/15* (2018.02); *H04W 76/19* (2018.02)

(58) Field of Classification Search
CPC ........ H04W 8/30; H04W 76/15; H04W 76/19
See application file for complete search history.

(56) References Cited

U.S. PATENT DOCUMENTS

| | | | |
|---|---|---|---|
| 2017/0142770 A1* | 5/2017 | Fu | H04L 1/1614 |
| 2019/0104560 A1 | 4/2019 | Nuggehalli | |
| 2019/0254100 A1* | 8/2019 | Yu | H04W 76/19 |
| 2019/0357137 A1 | 11/2019 | Shah et al. | |
| 2020/0028564 A1 | 1/2020 | Agiwal et al. | |
| 2020/0084664 A1 | 3/2020 | Wu | |
| 2020/0275519 A1* | 8/2020 | Sharma | H04W 80/02 |

(Continued)

FOREIGN PATENT DOCUMENTS

| | | |
|---|---|---|
| CN | 104955064 A | 9/2015 |
| CN | 109196902 A | 1/2019 |

(Continued)

OTHER PUBLICATIONS

International Search Report for PCT Patent Application No. PCT/CN2020/121077; mailed Jun. 23, 2021.

(Continued)

*Primary Examiner* — Deepa Belur
(74) *Attorney, Agent, or Firm* — Kowert, Hood, Munyon, Rankin & Goetzel, P.C.

(57) ABSTRACT

This disclosure relates to techniques for performing wireless communications using a split bearer. A user equipment device may perform a recovery operation for a lost uplink packet. The recovery operation may be in response to an indication from the network or may be initiated autonomously by the device.

16 Claims, 17 Drawing Sheets

(56) References Cited

U.S. PATENT DOCUMENTS

2022/0386172 A1* 12/2022 Xie ................... H04W 28/0278
2024/0031066 A1* 1/2024 Shirivastava ........... H04W 4/06

FOREIGN PATENT DOCUMENTS

| CN | 109392194 A | | 2/2019 |
|----|-------------|---|--------|
| CN | 109923899 A | | 6/2019 |
| JP | 2016063377 A | * | 4/2016 |

OTHER PUBLICATIONS

Samsung "PDCP recording for 3C bearer" 3GPP TSG-RAN WG2 Meeting #85 R2-141396; Valencia, Spain; Mar. 31-Apr. 4, 2014.

* cited by examiner

PDCP-Config Information Element

```
-- ASN1START
-- TAG-PDCP-CONFIG-START

PDCP-Config ::=         SEQUENCE {
    drb                     SEQUENCE {
        discardTimer            ENUMERATED {ms10, ms20, ms30, ms40, ms50, ms60, ms75, ms100,
                                            ms150, ms300, ms500, ms750, ms1500, infinity}
                                                                            OPTIONAL,   -- Cond Setup
        pdcp-SN-SizeUL          ENUMERATED {len12bits, len18bits}           OPTIONAL,   -- Cond Setup2
        pdcp-SN-SizeDL          ENUMERATED {len12bits, len18bits}           OPTIONAL,   -- Cond Setup2
        headerCompression       CHOICE {
            notUsed                 NULL,
            rohc                    SEQUENCE {
                maxCID                  INTEGER (1..16383)                  DEFAULT 15,
                profiles                SEQUENCE {
                    profile0x0001           BOOLEAN,
                    profile0x0002           BOOLEAN,
                    profile0x0003           BOOLEAN,
                    profile0x0004           BOOLEAN,
                    profile0x0006           BOOLEAN,
                    profile0x0101           BOOLEAN,
                    profile0x0102           BOOLEAN,
                    profile0x0103           BOOLEAN,
                    profile0x0104           BOOLEAN
                },
                drb-ContinueROHC        ENUMERATED { true }                 OPTIONAL    -- Need N
            },
            uplinkOnlyROHC          SEQUENCE {
                maxCID                  INTEGER (1..16383)                  DEFAULT 15,
                profiles                SEQUENCE {
                    profile0x0006           BOOLEAN
                },
                drb-ContinueROHC        ENUMERATED { true }                 OPTIONAL    -- Need N
            },
            ...
        },
        integrityProtection     ENUMERATED { enabled }                      OPTIONAL,   -- Cond ConnectedTo5GC1
        statusReportRequired    ENUMERATED { true }                         OPTIONAL,   -- Cond Rlc-AM
        outOfOrderDelivery      ENUMERATED { true }                         OPTIONAL    -- Need R
    },
    moreThanOneRLC          SEQUENCE {
        primaryPath             SEQUENCE {
            cellGroup               CellGroupId                             OPTIONAL,   -- Need R
            logicalChannel          LogicalChannelIdentity                  OPTIONAL    -- Need R
        },
        ul-DataSplitThreshold   UL-DataSplitThreshold                       OPTIONAL,   -- Cond SplitBearer
        pdcp-Duplication        BOOLEAN                                     OPTIONAL    -- Need R
    }                                                                       OPTIONAL,   -- Cond MoreThanOneRLC t-Reordering            ENUMERATED {
                                ms0, ms1, ms3, ms4, ms5, ms8, ms10, ms15, ms20, ms30, ms40,
```

FIG. 10

```
  [[
  cipheringDisabled    ENUMERATED (true)                                                                                                                                                                   OPTIONAL,  -- Need S
  ]]

ul-DataSplitThreshold  ::= ENUMERATED {
                             b0, b100, b200, b400, b800, b1600, b3200, b6400, b12800, b25600, b51200, b102400, b204800,
                             b409600, b819200, b1228800, b1638400, b2457600, b3276800, b4096000, b4915200, b5734400,
                             b6553600, infinity, spare8, spare7, spare6, spare5, spare4, spare3, spare2, spare1} ms50, ms60, ms80, ms100, ms120, ms140, ms160, ms180, ms200, ms220,
                             ms240, ms260, ms280, ms300, ms400, ms500, ms750, ms1000, ms1250,
                             ms1500, ms1750, ms2000, ms2250, ms2500, ms2750,
                             ms3000, spare28, spare27, spare26, spare25, spare24,
                             spare23, spare22, spare21, spare20,
                             spare19, spare18, spare17, spare16, spare15, spare14,
                             spare13, spare12, spare11, spare10, spare9,
                             spare08, spare07, spare06, spare05,
                             spare03, spare02, spare01}                                     OPTIONAL  -- Cond ConnectedTo5GC

-- TAG-RRCP-CONFIG-STOP
  -- ASN1STOP
```

FIG. 11

```
DRB-ToAddMod ::=       SEQUENCE {
    cnAssociation          CHOICE {
        eps-BearerIdentity     INTEGER (0..15),
        sdap-Config            SDAP-Config
    }                                                   OPTIONAL,   -- Cond DRBSetup
    drb-Identity           DRB-Identity,
    reestablishPDCP        ENUMERATED{true}             OPTIONAL,   -- Need N
    recoverPDCP            ENUMERATED{true}             OPTIONAL,   -- Need N
    pdcp-Config            PDCP-Config                  OPTIONAL,   -- Cond PDCP
    ...,
    [[
    daps-Config-r16        ENUMERATED{true}             OPTIONAL    -- Need N
    ]]
}
```

FIG. 14

```
-- ASN1START
-- TAG-RLC-BEARERCONFIG-START

RLC-BearerConfig ::=           SEQUENCE {
    logicalChannelIdentity         LogicalChannelIdentity,
    servedRadioBearer              CHOICE {
        srb-Identity                   SRB-Identity,
        drb-Identity                   DRB-Identity
    }                                                           OPTIONAL,   -- Cond LCH-SetupOnly
    reestablishRLC                 ENUMERATED{true}             OPTIONAL,   -- Need N
    rlc-Config                     RLC-Config                   OPTIONAL,   -- Cond LCH-Setup
    mac-LogicalChannelConfig       LogicalChannelConfig         OPTIONAL,   -- Cond LCH-Setup
    ...,
    [[
    rlc-Config-v1610               RLC-Config-v1610             OPTIONAL    -- Need R
    ]]
}
```

FIG. 15

```
PDCP-Config ::=    SEQUENCE {
    drb              SEQUENCE {
        discardTimer         ENUMERATED {ms10, ms20, ms30, ms40, ms50, ms60, ms75, ms100,
                                          ms150, ms200, ms250, ms300, ms500, ms750, ms1500, infinity}
        pdcp-SN-SizeUL       ENUMERATED {len12bits, len18bits}                    OPTIONAL,  -- Cond Setup
        pdcp-SN-SizeDL       ENUMERATED {len12bits, len18bits}                    OPTIONAL,  -- Cond Setup2
        headerCompression    CHOICE {                                              OPTIONAL,  -- Cond Setup2
            notUsed              NULL,
            rohc                 SEQUENCE {
                maxCID               INTEGER (1..16383)                            DEFAULT 15,
                profiles             SEQUENCE {
                    profile0x0001        BOOLEAN,
                    profile0x0002        BOOLEAN,
                    profile0x0003        BOOLEAN,
                    profile0x0004        BOOLEAN,
                    profile0x0006        BOOLEAN,
                    profile0x0101        BOOLEAN,
                    profile0x0102        BOOLEAN,
                    profile0x0103        BOOLEAN,
                    profile0x0104        BOOLEAN
                },
                drb-ContinueROHC     ENUMERATED { true }                           OPTIONAL   -- Need N
            },
            uplinkOnlyROHC       SEQUENCE {
                maxCID               INTEGER (1..16383)                            DEFAULT 15,
                profiles             SEQUENCE {
                    profile0x0006        BOOLEAN
                },
                drb-ContinueROHC     ENUMERATED { true }                           OPTIONAL   -- Need N
            }
        },
    },
```

FIG. 16

```
    ...
    integrityProtection        ENUMERATED { enabled }                OPTIONAL,    -- Cond ConnectedTo5GC1
    statusReportRequired       ENUMERATED { true }                   OPTIONAL,    -- Cond RLC-AM-UM
    outOfOrderDelivery         ENUMERATED { true }                   OPTIONAL,    -- Need R
                                                                     OPTIONAL,    -- Cond DRB
moreThanOneRLC       SEQUENCE {
    primaryPath          SEQUENCE {
        cellGroup                CellGroupId                         OPTIONAL,    -- Need R
        logicalChannel           LogicalChannelIdentity              OPTIONAL,    -- Need R
        PDCPRecovery             ENUMERATED { true }                 OPTIONAL    -- Need N
    }                                                    OPTIONAL
    ul-DataSplitThreshold    UL-DataSplitThreshold                   OPTIONAL,    -- Cond SplitBearer
    pdcp-Duplication         BOOLEAN                                 OPTIONAL,    -- Need R
                                                                     OPTIONAL,    -- Cond MoreThanOneRLC
}
```

FIG. 17

SPLIT BEARER COMMUNICATIONS

PRIORITY CLAIM INFORMATION

This application is a national stage application of International Application No. PCT/CN2020/121077, filed on Oct. 15, 2020, titled "Split Bearer Communications", which is hereby incorporated by reference in its entirety.

TECHNICAL FIELD

The present application relates to wireless communication, including to avoiding delay and/or desynchronization of split bearer transmissions.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be use of split bearers. Improvements in the field are desired.

SUMMARY

Embodiments are presented herein of, inter alia, systems, apparatuses, and methods for performing radio resource control connection procedures for rapidly moving wireless devices in a wireless communication system.

As noted above, the number of use cases for wireless networks communicating with different classes of user equipment devices (UEs) with widely variable capabilities and usage expectations are growing. One direction in expansion of possible use cases supported by wireless communication techniques may include increasing use of techniques for communication using multiple paths, e.g., split bearers. A transmission of a packet may fail, and the failure may lead to desynchronization between the multiple paths. Accordingly, the techniques described herein include techniques for a UE (e.g., in communication with a network) to recover and retransmit the failed packet quickly, e.g., without desynchronization.

For example, a UE may communicate with a network via a split bearer. One path or leg of the split bearer may be designated as a primary path/leg and one or more other path/legs may be secondary. The UE may transmit packets to the network using a packet data convergence protocol (PDCP) entity associated with the split bearer. The transmission may use one of the path/legs. The network may transmit to the UE acknowledgements for packets received and/or negative acknowledgements for packets not received. The network may further transmit an indication to use a different path/leg and/or to perform a recovery operation. Alternatively, the UE may determine to perform the recovery operation autonomously (or automatically), e.g., without an explicit indication from the network. The UE may perform the recovery operation and may retransmit any packets that were not successfully received by the network.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 10 and 11 illustrate aspects of split bearer configuration, according to some embodiments;

FIGS. 13-17 illustrate aspects of network initiated recovery operations, according to some embodiments.

Figure 1:
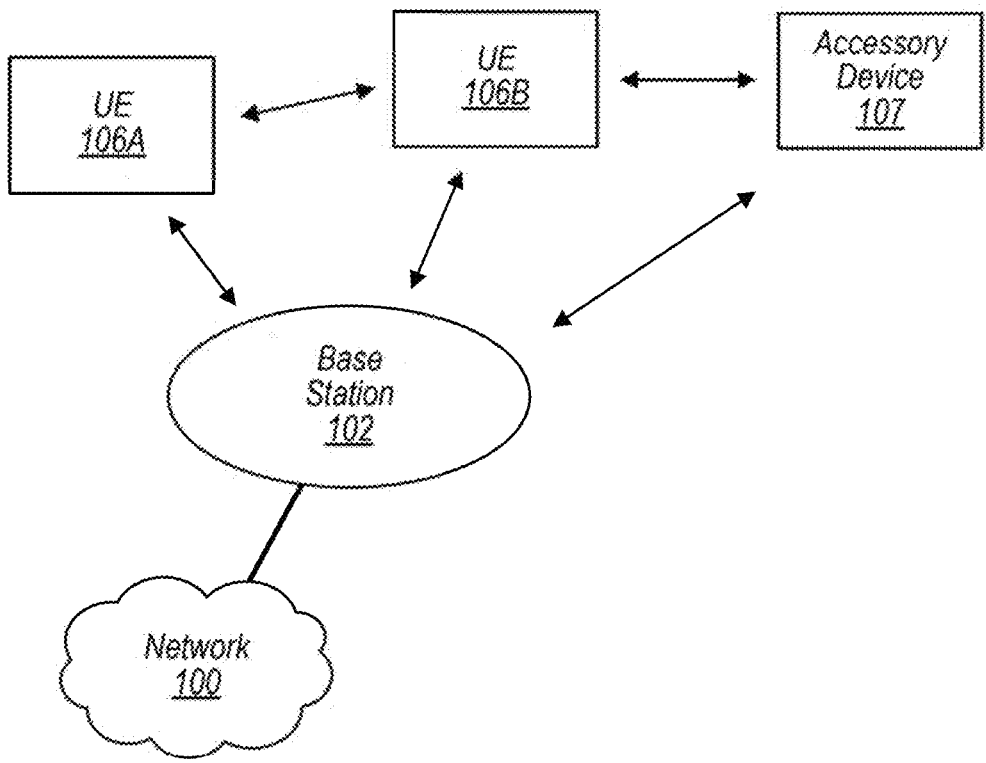
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
RRC: Radio Resource Control
MAC: Media Access Control
CE: Control Element
Tx: Transmission (or transmit)
Rx: Reception (or receive)
RS: Reference Signal
CSI: Channel State Information
PDCP: packet data convergence protocol
RLC: radio link control

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays). PLDs (Programmable Logic Devices). FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
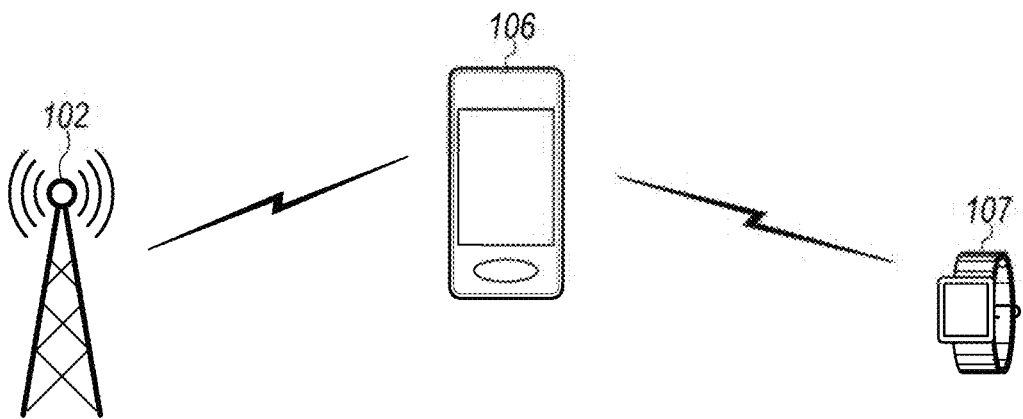
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted to that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the LE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory 13 device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 10 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
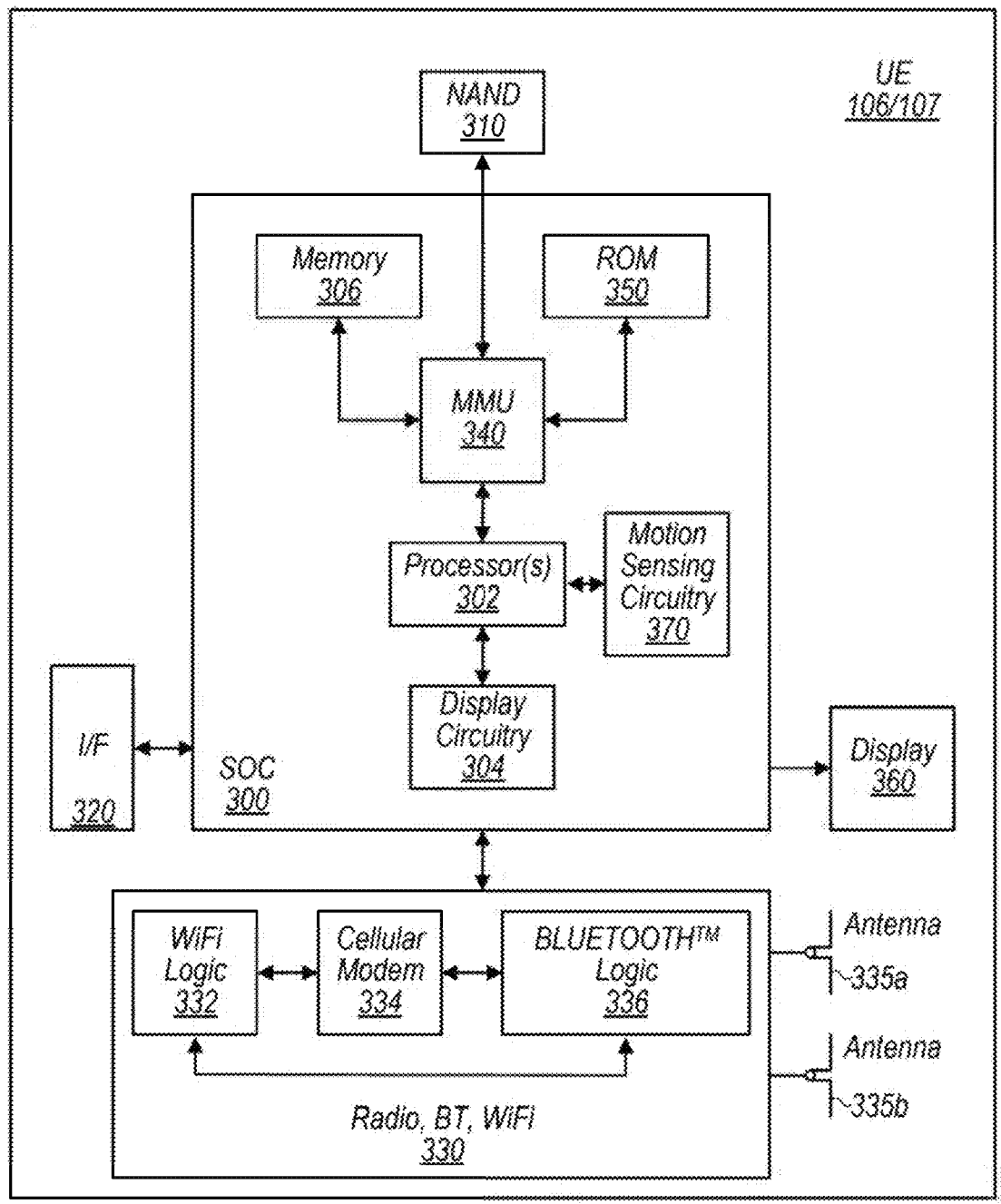
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
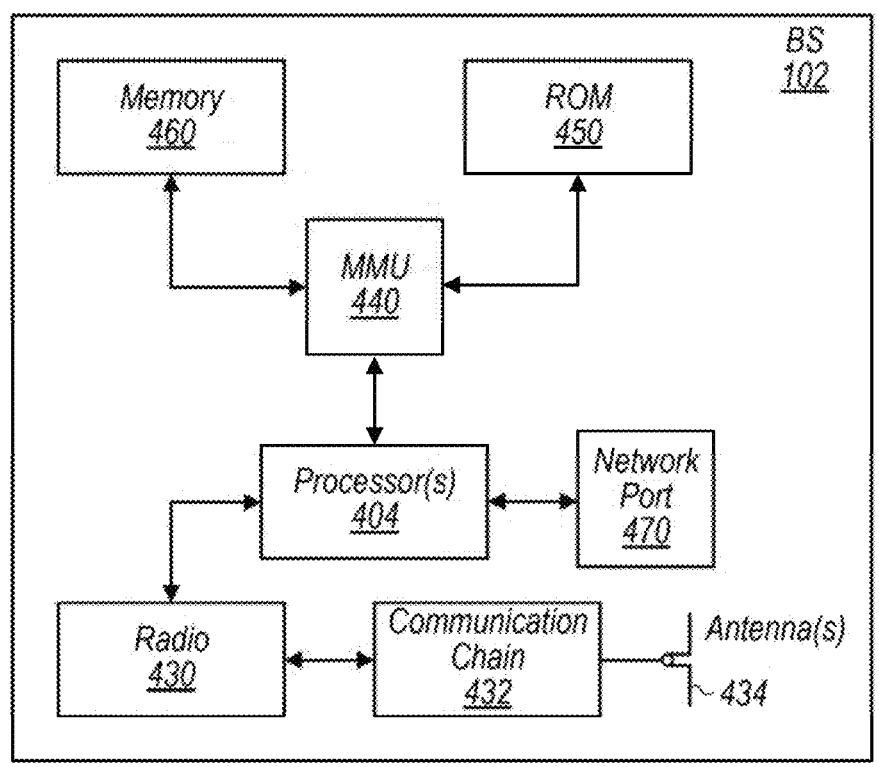
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR. LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
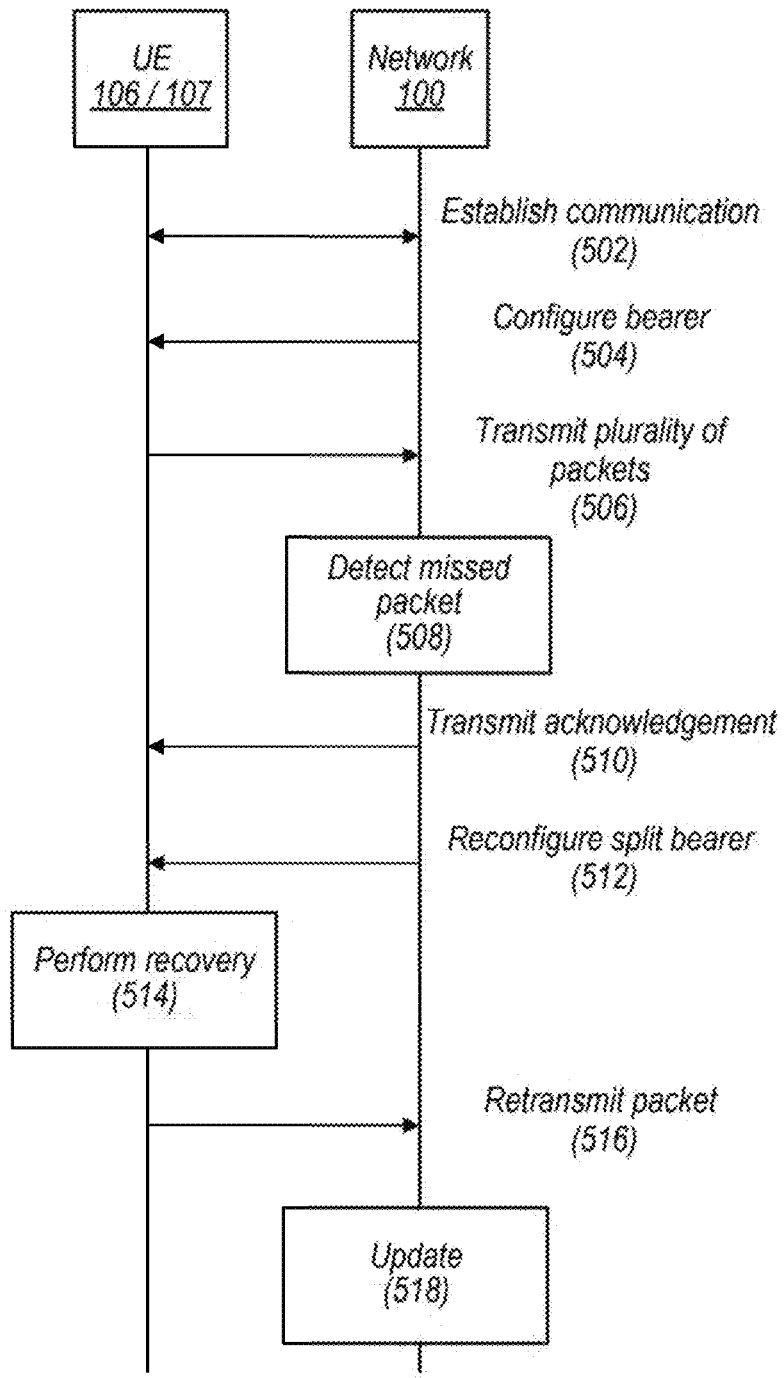
FIG. 5 is a communication flow diagram illustrating an example method for communication using a split bearer, according to some embodiments.

FIG. 5—Communication Flow Diagram

Communications between a network and a UE may use one or more paths (e.g., legs). For example, a split bearer may be established between a UE and a network so that communications can be split between multiple paths. For example, the different paths may be associated with different cells and/or different radio access technologies.

A transmission (e.g., an uplink transmission from a UE to a network) may fail on a first path. The network may configure the UE to use a second path. However, due to any of various possibilities regarding the relative timing of reordering windows, reordering timers, reconfiguration, and retransmission of the failed transmission, the delay between the initial transmission and the successful retransmission of a packet may be sufficient to cause desynchronization of the paths and/or otherwise interfere with efficient communication between the UE and the network.

FIG. 5 is a communication flow diagram illustrating an example method for performing communication using multiple paths, according to some embodiments. The method of FIG. 5 may mitigate some delay and/or desynchronization challenges. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a UE, such as the UEs 106 or 107, a cellular network, and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

The UE and the network may establish communication (502), according to some embodiments. The UE and the network may communicate using one or more radio access technologies (RATs), e.g., including NR. The UE and the network may communicate using one or more BS 102. The BS 102(s) may provide one or more cell and/or cell groups and the communication between the UE and the network may use one or more cell and/or cell group.

The UE and network may exchange application and/or control data in the uplink and/or downlink directions. The communication and measurements may occur on any frequency or combination of frequencies, e.g., including licensed and/or unlicensed spectrum. The communication and measurements may continue (e.g., periodically, randomly, as needed, etc.) for any amount of time. For example, the communication and measurements may occur over any number of subframes, slots, and/or symbols. The measurements may include any radio link measurements such as signal-noise ratio (SNR), signal to interference and noise ratio (SINR), reference signal received power (RSRP), reference signal received quality (RSRQ), received signal strength indicator (RSSI), block error rate (BLER), bit error rate (BER), channel impulse response (CIR), channel error response (CER), etc. The UE and/or network may retain a history of measurement values. The UE/network may compare the measurement values, or metrics calculated based on the measured values, to one or more thresholds. The UE/network may use various parameters, e.g., for hysteresis, in such comparisons. The measurements, thresholds, and/or parameters may be configured by the network (e.g., by the network) and/or by the UE. The UE and/or network may report measurement values (e.g., directly and/or as channel quality indicator (CQI), channel state information (CSI), etc.), comparison results, etc. to each other at any time.

The communication may use an acknowledged mode (AM) and/or unacknowledged mode (UM). For example, in an AM, transmissions may be positively acknowledged (ACK) and/or negatively acknowledged (NACK) using a hybrid automatic repeat request (HARQ) system. In UM, these transmissions may not be acknowledged (e.g., positively and/or negatively). For example, the network may configure the UE to use AM.

The network may transmit control information to the UE to configure one or more bearers (504), according to some embodiments. For example, the UE may be configured to use a split bearer and/or other communication approach using multiple logical paths to communicate 13 with the network. For example, a split bearer may use a combination of a master cell group (MCG) and a secondary cell group (SCG). In some cases, the split bearer may use a non-cellular RAT. For example, one path may use a cellular RAT (e.g., LTE, NR, etc.) and another path may use a non-cellular RAT, e.g., WLAN.

In some embodiments, the network may configure the bearer in AM.

In some embodiments, additional and/or different bearers may be configured.

The control information configuring the bearer(s) may identify a primary path. Other paths may be identified as (e.g., explicitly or implicitly) as secondary, tertiary, etc. For example, a path using a SCG may be configured as a primary path and a path using a MCG may be a secondary path, or vice versa.

The control information may indicate a data split threshold. Uplink transmissions for an amount of data less than the threshold may use a single path (e.g., a primary path) and transmissions with amounts of data greater than or equal to the threshold may use both paths (e.g., as scheduled by the network).

The control information may specify conditions (e.g., one condition or a set of conditions) for performing recovery operations, e.g., such as a packet data convergence protocol (PDCP) data recovery procedure, among various possibilities. Existing technical specifications may provide for use of PDCP data recovery in three cases, e.g., handover without security change, bearer type change, and reconfiguration after re-establishment. As discussed further herein, additional cases may be allowed, according to some embodiments. For example, the control information may indicate that the network may explicitly trigger recovery operations using a flag associated with a (e.g., future) bearer reconfiguration. Alternatively, the control information may indicate conditions under which the UE may autonomously (or automatically) perform recovery operations. For example, the control information may indicate that the UE may perform recovery operations in response to an implicit indication from the network, based on measurements, and/or based on a transmission failure threshold, among other possibilities.

Further, the control information may specify aspects of the recovery operations for the UE to perform. In some embodiments, the aspects of the recovery operations for the UE to perform may depend on the conditions that trigger the recovery operations. For example, the control information may indicate when/whether the UE should: reestablish a radio link control (RLC) entity, perform recovery without reestablishing the RLC entity, and/or suspend an RLC entity.

In some embodiments, the control information may be transmitted via radio resource control (RRC), among various possibilities.

The UE may transmit a plurality of packets to the network (506), according to some embodiments. The plurality of packets may comprise uplink data.

The packets may be transmitted on the bearer, e.g., a split bearer configured according to the control information. The packets may be transmitted on a primary path or a secondary path, e.g., according to a data split threshold and/or scheduling by the network (e.g., according to which path(s) the network provides an uplink grant(s)). The packets may be provided to a PDCP layer from an upper layer (e.g., of the UE). The PDCP layer may maintain sequence number (SN) information of the packets. The PDCP layer of the UE may route the packets to one or more RLC entities, e.g., corresponding to the path or paths on which the packets are to be transmitted. An RLC entity may provide the packets to a media access control (MAC) layer entity (e.g., according to a RAT used by the path) for further processing and transmission.

The packets may be protocol data units (PDU), according to some embodiments. The RLC layer may assemble the PDUs from service data units (SDU) which may be provided by a higher layer (e.g., PDCP), according to some embodiments.

The packets may be transmitted on any combination of time/frequency resources, e.g., resource blocks (RB) or resource elements (RE). The packets may be transmitted according using an AM RLC entity, according to some embodiments.

The network may receive some or all of the packets, e.g., using MAC, RLC, and PDCP entities corresponding to the entities of the UE. For example, the RLC entity (or entities) may track which packets are received (e.g., based on SN). For example, a PDCP entity of the network may perform functions including duplication detection and/or reordering the packets, e.g., based on SN, prior to providing the packets to an upper layer.

The packets may be or include data packets. In some embodiments, the packets may include control information in addition to or instead of data.

The network may detect that at least one of the plurality of packets is missing (508), according to some embodiments. For example, based on the SN of received packets, the network (e.g., at an RLC layer and/or a PDCP layer) may determine that a SN has not been received (e.g., based on receiving packets 1, 2, and 4, the network may detect that packet with SN=3 is missing). The network may maintain one or more timers (e.g., T-reordering) associated with any gap in received SN values (e.g., SN=3). Thus, the packet may be considered missing upon expiration of the corresponding timer.

The network may further maintain reordering windows, which may be associated with one or more paths. The reordering window may represent a range of SN values expected to be received, e.g., on the corresponding path.

The network may transmit acknowledgement to the UE based on the received packet(s) (510), according to some embodiments. For example, in response to receiving a packet or a group of packets, the network (e.g., an RLC entity) may generate positive acknowledgement (ACK) for the received packet(s) and transmit the ACK(s) to the UE. Similarly, the network may transmit negative acknowledgement (NACK) for any packets not successfully received. In some embodiments, the network may not transmit NACK and may implicitly indicate that packets are not received based on a lack of positive acknowledgement.

Based on the acknowledgement that is or is not transmitted, the UE may determine which packets of the plurality of packets were or were received by the network.

The network may reconfigure the bearer (512), according to some embodiments. For example, the network may reconfigure the bearer to change which path is a primary path. For example, a primary path may be switched from an MCG to an SCG or vise versa.

The reconfiguration may be performed for any of various reasons. For example, the reconfiguration may be based on measurements performed by the network and/or measurements reported by the UE. Similarly, the reconfiguration may be based on network conditions, e.g., traffic load of one or more cell or cell group, etc. Further, the reconfiguration may be based on a number of missed packets (e.g., in the uplink and/or downlink direction) reaching a threshold. Any combination of these or other reasons may be used.

The network may transmit the reconfiguration as a message to the UE, e.g, as an RRC reconfiguration message.

The reconfiguration message may include or be associated with one or more indications to the UE in response to one or more packets not correctly received by the network. For example, the message may be associated with an indication to perform recovery operations. Further, the message may associated with an indication to re-establish one or more RLC entities. Further, the message may associated with an indication to suspend one or more RLC entity. Further, the message may associated with an indication to flush one or more RLC entities.

These indications may be provided in any combination of messages. For example, any of these may be provided in an RRC reconfiguration message or may be provided in one or more separate messages. If such an indication is included in an RRC reconfiguration message, it may be in the form of a flag in a configuration of a relevant layer. For example, an indication to perform PDCP recovery may be in the form of a flag for PDCP configuration. Similarly, an indication to re-establish, suspend, or flush an RLC entity may be in the form of a flag for RLC configuration.

It will be appreciated that, although 512 is illustrated as occurring after 508 and 510, that this ordering is an example.

In some embodiments, 512 may occur prior to 508 and/or 510 or simultaneously. Thus, the reconfiguration may be based entirely or in part on determining the packet(s) is missing or the reconfiguration may be entirely based on other factors (e.g., radio measurements, network conditions, etc.).

The UE may determine to perform a recovery operation and the UE may perform the recovery operation (514), according to some embodiments.

The determination to perform the recovery operation may be in response to an explicit indication from the network or may be determined autonomously (or automatically) based on conditions. Such conditions for an autonomous determination (e.g., or an implicit indication) may be described in standards and/or configured in control information (e.g., as discussed above regarding 504).

The recovery operations may include PDCP data recovery. A PDCP recovery may include reestablishing any RLC entities associated with a bearer of the PDCP entity. A PDCP data recovery operation may include providing a PDCP status report to the network. The status report may identify the packets (e.g., by SN) that have or have not been transmitted to and/or acknowledged by the network.

In some embodiments, the recovery operations may include re-establishing, flushing, suspending one or more entities, e.g., RLC and/or PDCP entities of the UE. For example, to re-establish an RLC entity, the UE may end (or temporarily suspend) an RLC entity associated with an old path and create or activate an RLC entity associated with a new path, e.g., as indicated in 512.

To flush an RLC entity, the UE may treat one or more packets that were not positively acknowledged (and/or were negatively acknowledged) as being acknowledged in the RLC entity. The PDCP entity may then re-provide the packets to the RLC entity (e.g., with new SNs) for transmission to the network, e.g., as if they were new packets.

To suspend an RLC entity, the UE may temporarily suspend RLC operations (e.g., for the particular bearer) and await instruction from the network regarding how/if to resume those RLC operations (e.g., in the existing RLC entity or in a different/new RLC entity).

In some embodiments, the UE may further provide relevant information to the network. For example, the UE may transmit an indication that the recovery operations are being (or will be or were) performed. Further, the UE may transmit an indication of the status of any relevant entity, e.g., PDCP and/or RLC entity. For example, the UE may indicate that an RLC entity was re-established and may provide information about the re-established entity. Similarly, the UE may indicate the SN(s) of any packet(s) that are being treated as acknowledged if an RLC entity is flushed. Further, the UE may indicate suspension of an RLC entity.

Such indication may be provided in any of various ways. For example, one or more RRC message may be used to convey the indication(s) using one or more flags. Alternatively, or additionally, other forms of uplink control information may be used.

The UE may retransmit one or more packet (516), according to some embodiments. For example, the UE may retransmit any packet(s) missed by the network as determined by the UE based on ACK and/or NACK received (as described above with respect to 510). For example, the UE may perform retransmission of all packets previously submitted to an AM RLC entity for which the successful delivery has not been confirmed by lower layers. The packets may be transmitted in ascending order (e.g., of SN and/or of an associated COUNT value) from the first packet (e.g., PDCP PDU) for which delivery is not confirmed.

It will be appreciated that 516 is illustrated separately from 514 for the sake of clarity. However, the retransmission may be performed as part of the recovery operations, according to some embodiments. For example, the retransmission of the packets may occur before, after, during, or simultaneously with other aspects of the recovery operation.

The network may update entities to correspond to the reconfiguration (518), according to some embodiments. For example, the network may re-establish, suspend, release, flush, and/or reconfigure RLC entities to match the corresponding RLC entity of the UE, e.g., based on an explicit indication from the UE and/or based on determining the UE's actions from other information (e.g., control information provided to the UE and/or measurement reports, SNs, or other information received from the UE). The network may treat as acknowledged any packets that the UE indicates it is treating as acknowledged, Thus, the RLC and/or PDCP buffer(s) of the network may be consistent with those of the UE. Further, the network may update any timers and/or reordering windows associated with the received packets, reconfigured RLC and/or PDCP entities, etc.

Figure 6:
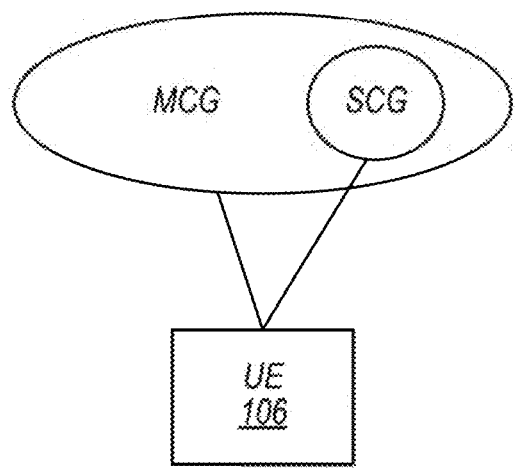
FIGS. 6-8 illustrate aspects of dual connectivity communication, according to some embodiments.
Figure 7:
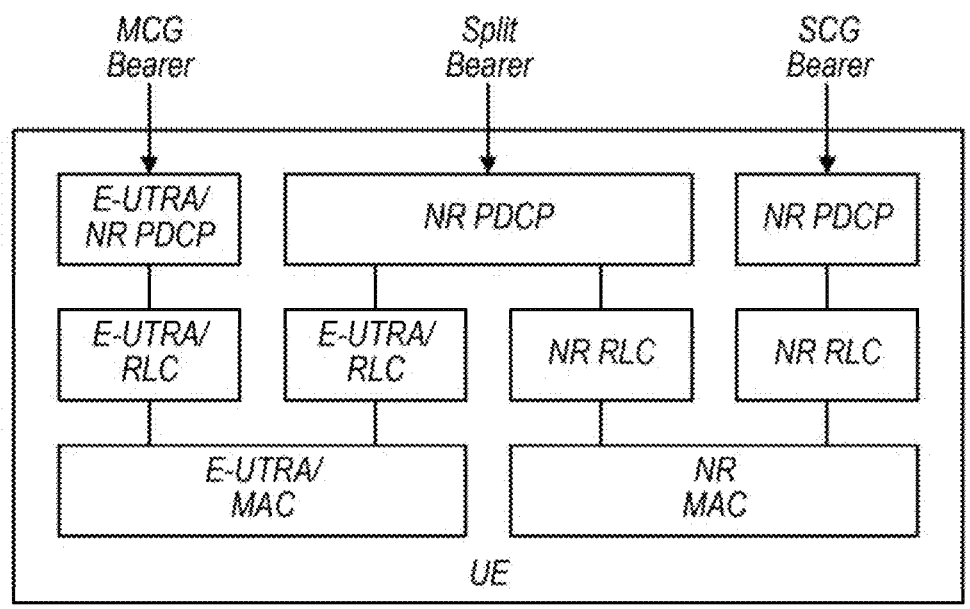
Figure 8:
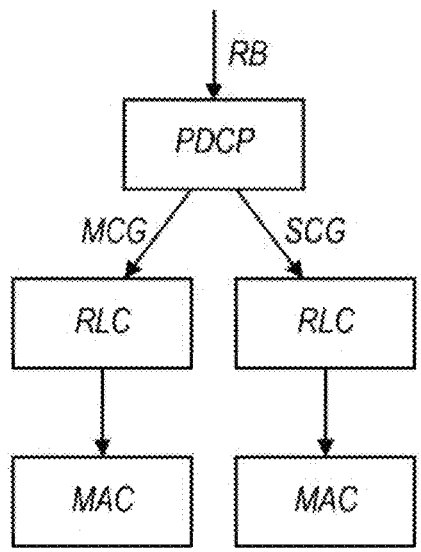

FIGS. 6-8—Dual Connectivity Operations

Various types of dual connectivity (DC) operations may be used by a network in communication with a UE. For example, multi-RAT dual connectivity (MR-DC) may describe a configuration in which a UE communicates with a network via multiple RATs, e.g., at the same time, e.g., using multiplexing.

FIG. 6 illustrates a UE in communication with an MCG and an SCG, according to some embodiments. In some embodiments, an MCG may be a large cell and an SCG may be a small cell. In other embodiments, the MCG and the SCG may be the same size, or the SCG may be a large cell and the MCG may be a small cell.

According to DC operations in the control plane, a UE may maintain two connectivities, e.g., in MCG and SCG. In the MCG, a primary cell (PCell) may be always activated. In the SCG, a primary cell of the SCG (PSCell) may be always activated.

According to DC operations in the user plane, a UE may support three bearer types: 1) MCG-bearer, 2) SCG-bearer, and 3) split bearer. FIG. 7 illustrates a UE side radio protocol architecture for these three types of bearers, according to some embodiments. As shown, each bearer may have its own PDCP entity. The PDCP entity of the split bearer may be associated with RLC entities of each cell group (e.g., shown as different RATs, but it will be appreciated that the RATs of the cell groups may be the same, that the RATs may be reversed so that the MCG may be NR, and/or different RATs may be used, etc.). At the MAC layer, each path/cell group may be associated with an independent MAC entity.

For a split-bearer, uplink operations may be controlled in part by a data split threshold (e.g., DataSplitThreshold). The threshold may be configured by RRC, according to some embodiments. For data amount less than DataSplitThreshold, UL transmission may be via the primary leg (e.g., RRC configured). For data amount greater than or equal to DataSplitThreshold. UL transmission may occur via one or both legs, e.g., according to scheduling by the network.

FIG. 8 illustrates uplink transmission using a split bearer, according to some embodiments. Data (e.g., any number of RB) may be provided to the PDCP entity of the split bearer from an upper layer of the device. According to the data split threshold and/or scheduling information from the network, the PDCP entity may split the data into a first portion for transmission via the RLC and MAC of the MCG and a second portion for transmission via the RLC and MAC of the SCG.

Figure 9:
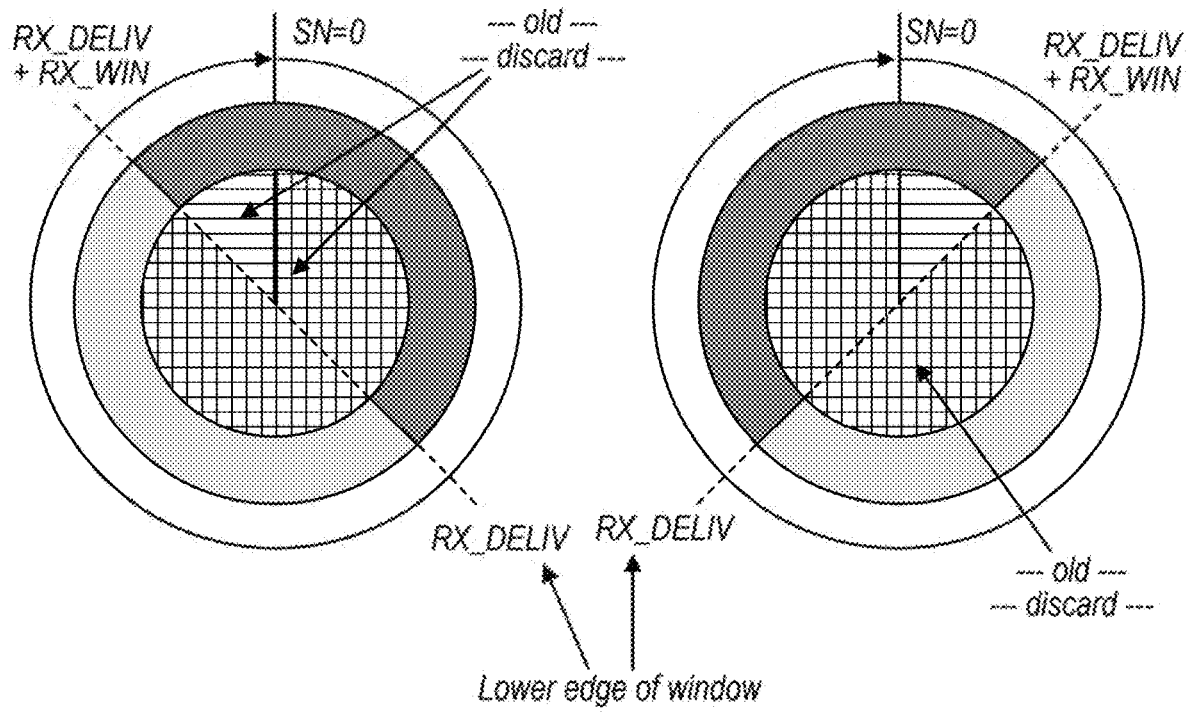
FIG. 9 illustrates aspects of reception, according to some embodiments.

FIG. 9—Reception Operations

FIG. 9 illustrates reception operations, according to some embodiments. In some embodiments, a PDCP layer (e.g., of a receiving device. e.g., at a network in the case of uplink transmissions) may perform reordering and duplication detection based on the data delivered from two links (e.g., two paths of a split bearer). The reordering may be applicable on all received packets within PDCP reordering window, e.g., regardless of which path(s) the packets are received on. The reordering window may be a range of SN values.

A PDCP reordering window (also referred to as a push window) may move (e.g., rotate clockwise, as shown in the Figure) based on either of two cases:

Case 1: receive a new packet (e.g., data) in-sequence from lower layer. For example, a reordering window may be advanced by the number of packets (e.g., SN) successfully received in order. For example, in response to receiving packets with SN 3-5, the lower edge of a reordering window may be advanced to SN 6.

Case 2: based on expiry of a timer (e.g., T-reordering). For example, the timer (e.g., T-reordering) may be started based on reception gap detection. In other words, if there is a gap in the SN values of successfully received packets, the timer may be started. The timer may control the delay of reordering window moving. Upon timer expiry, a lower edge of the reordering window may be moved to a next gap in SN values of successfully received packets. For example, if SN 3 is missing when SN 4 is received and SN 3 is not received while the timer is running, the lower edge of the reordering window may be advanced to the SN value of the next higher packet that is not yet received, e.g., SN 5.

PDCP recovery may be used in the following cases, in addition to cases discussed above with respect to the method of FIG. 5: 1) handover (e.g., between cells or intra-cell handover) without security change (e.g., the UE may retransmit unacknowledged packets without reestablishing RLC); 2) bearer type change, e.g., initiated by the network; and 3) the first RRC reconfiguration after UE connection re-establishment (e.g., triggered by radio link failure (RLF). PDCP recovery may include re-establishing the associated RLC entity and retransmission of the unacknowledged PDCP PDU from PDCP layer, among various possibilities.

FIGS. 10 and 11—Split Bearer Configuration

FIGS. 10 and 11 (FIG. 11 is a continuation of FIG. 10) illustrate split bearer configuration, according to some embodiments. Specifically, FIGS. 10 and 11 illustrate an information element (IE) that may be used to configure functions related to a split bearer. Note that a data radio bearer (DRB) may be an example of a bearer as discussed herein.

Split bearer configuration may be performed by RRC. More than one RLC entity may be associated to the PDCP entity associated with the bearer. The primary path (re) configuration may be via the normal RRCReconfiguration. The bearer type configuration may be decided by the network (e.g., based on network configuration). The following may be examples of handling associated with (e.g., during) the RRC Reconfiguration.

In a first case, a split DRB may be configured with a primary path change. When the available data amount is less than DataSplitThreshold, the UE may deliver the new packet to the new primary path. The UE may continue the ongoing transmission via the previous primary path.

In a second case, a bearer type may change. The change may not include a security change and may not reestablish PDCP. For example, a split DRB may be changed (e.g., reconfigured) to a MCG or SCG DRB. The network may trigger the PDCP recovery procedure, and PDCP entity of the UE may retransmit the unacknowledged packets with the same PDCP SN.

In a third case, a split DRB transmission may be suspended during the SCG/MCG fast 13 failure recovery. The UE may suspend the transmission via the problematic path/CG, and may continue the transmission on the good path/CG. Upon receiving the associated RRC configuration for recovery purpose, the UE may resume the transmissions on the previously problematic path.

Figure 12:
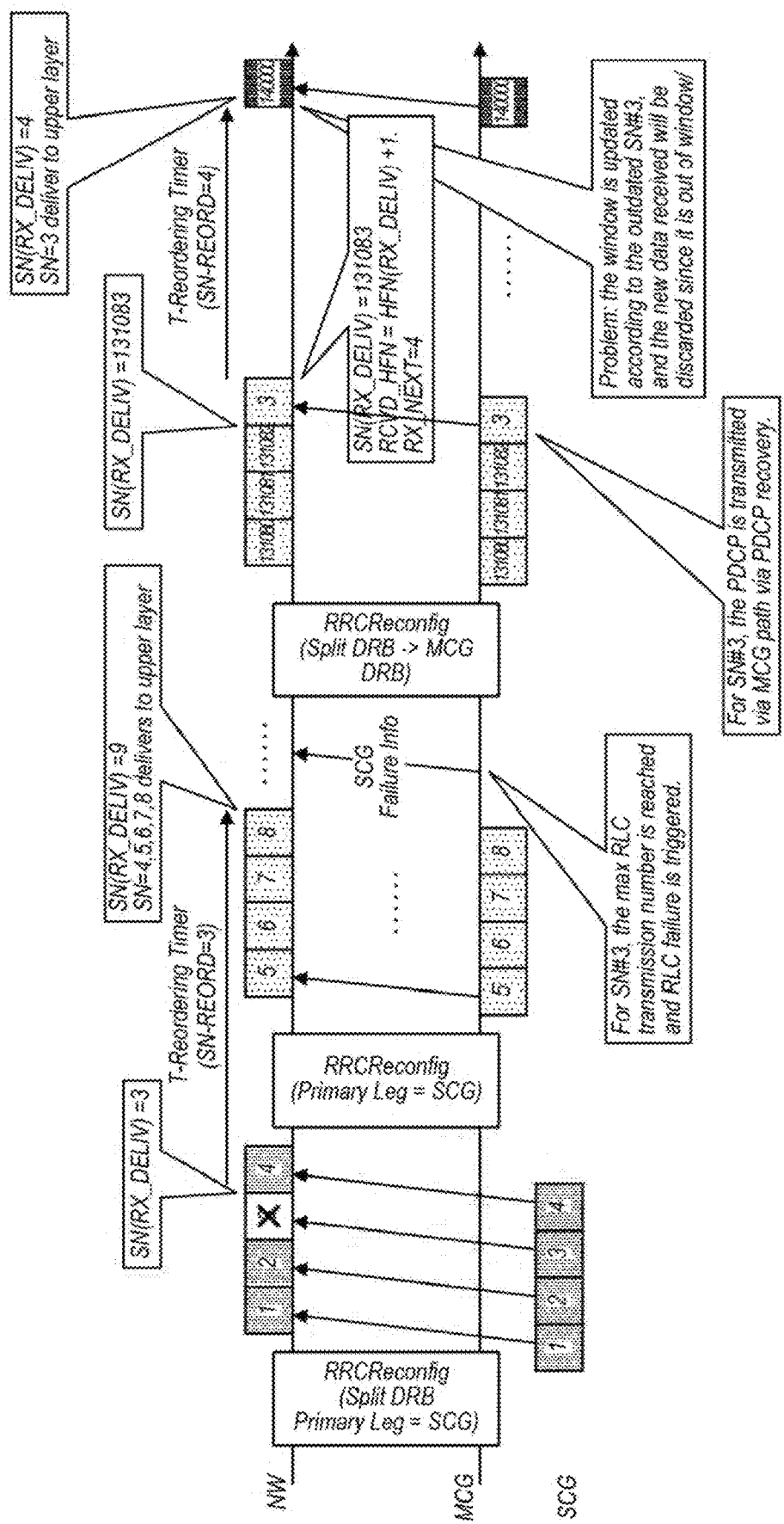
FIG. 12 illustrates aspects of delay in split bearer operation, according to some embodiments.

FIG. 12—Delay and Desynchronization in Split Bearer Operations

FIG. 12 illustrates an example scenario that may lead to delay and/or desynchronization, according to some embodiments. According to current PDCP receiving operation, the receiving window may be moving based on T-reordering timer expiry. The configuration of T-reordering may be designed to cope with the potential RLC/MAC retransmission delay between the two legs. The configuration of t-reordering may be based on a certain (e.g., assumed) degree of synchronization of transmission between the two links.

The desynchronization between two links may disrupt the PDCP receiving operation in the following scenario. For example, if the network starts the T-reordering due to lack of the packet (e.g., PDCP PDU #5), then upon the T-reordering expiry, the network may not receive this PDU. Accordingly, the PDCP receiving window may move forward. Thus, the outdated PDCP PDU #5 may arrive too late (e.g., after timer expiry), but it may still be in the current PDCP receiving/reordering window. Thus, the network PDCP may regard this PDU as a fresh packet and may start the t-reordering timer for the missing PDU. The network may update the PDCP window and may deliver the packet to upper layer accordingly.

Desynchronization may occur in association with an RRC procedure. For example, desynchronization may occur in the following scenario, as illustrated in FIG. 12. A primary path of a split DRB may be switched from SCG to MCG. Prior to the switch, a packet (SN #3) transmitted via the SCG may not be successfully received by the network (NW). New data transmission via the new primary path (e.g., MCG) may occur. An ongoing transmission of the PDCP PDU (e.g., SN #3) on a primary path (e.g., SCG) may continue on the current path (SCG), The SCG path may experience poor uplink radio conditions and RLC failure may be detected a long time later. Thus, SCG failure procedure may be triggered. In response to the SCG failure indication, the network may provide the RRCReconfiguration to release SCG and reconfigure split DRB to MCG DRB. In association with reconfiguring the bearer, the network may trigger PDCP recovery (e.g., the network may mark the PDCP recovery=True). Accordingly, the UE may perform the PDCP recovery procedure. The UE (e.g., via a PDCP entity) may retransmit the PDCP PDUs that were not successfully transmitted in SCG (e.g., SN #3). However, the following problem may occur. Due to the amount of new data transmitted on the MCG and the amount of time prior to the PDCP PDU retransmission, desynchronization may occur. For example, the network may regard the outdated PDCP PDU (SN #3) as a new packet and may trigger the window moving accordingly. For example, the PDCP PDU may arrive too late for the correct reordering window (e.g., after expiration of a timer) and may be treated as a new PDU (thus moving a later reordering window and potentially impacting the processing of other packets). For example, packets received after SN #3 may be discarded (e.g., prior to the expiration of the reordering timer while the network is expecting packet SN #4, e.g., SN-REORD=4). Thus, the next packet to be received and not discarded may be SN #1400.

FIGS. 13-17—Network Initiated Recovery Operations

Figure 13:
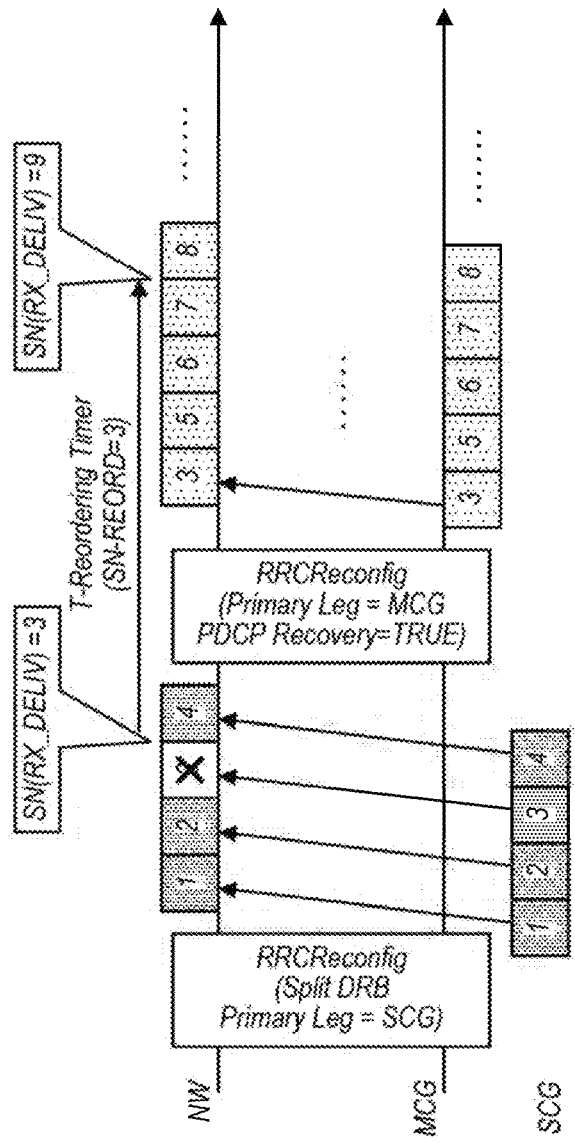

FIG. 13 illustrates network initiated recovery operations, according to some embodiments. FIG. 13 begins similarly to FIG. 12, e.g., packets 1-4 are transmitted on an SCG of a split bearer. Packet SN #3 may not be received by the network. The network may start a timer (T-reordering), e.g., while expecting packet SN #3. As in FIG. 12, the network may reconfigure the split bearer to use the MCG as the primary path. The network may transmit positive acknowledgements for packets 1, 2, and 4 and/or transmit negative acknowledgement for packet 3. The UE may thus determine that packet 3 was not received. The acknowledgement may be transmitted before, concurrently with or after the reconfiguration indication. However, in contrast to FIG. 12, the network may explicitly indicate to the UE to perform recovery operations in the RRC Reconfiguration message or in another message. Among various options, the network may indicate the recovery operations as follows:

Option 1: PDCP Recovery flag=TRUE in PDCP-Config. In this case, the UE may not be explicitly directed to re-establish the RLC entity, but may determine (e.g., based on an implicit understanding that RLC may be re-established as part of recovery operations) to do so. In some embodiments, the UE may determine various configuration options for the re-established RLC entity.

Option 2: PDCP Recovery flag=TRUE in PDCP-Config; and re-establishment RLC flag=TRUE in RLC-Config. In this case, the network may explicitly indicate to re-establish RLC and may further (e.g., optionally) specify any RLC configuration options, according to some embodiments.

Other options for the indication may be used as well. For example, other types of control information (e.g., MAC CE, DCI) or separate messages may be used as desired.

In response to the reconfiguration and/or indication to perform recovery, the UE may perform any of the following operations.

The UE may re-establish the associated RLC entity. For example, the RLC entity associated with the SCG may be re-established in association with the MCG.

The UE may perform PDCP data recovery procedure, and may retransmit unacknowledged PDCP PDU via another link. Thus, the SN #3 may be retransmitted on the MCG, e.g., without waiting for SCG failure.

The UE and the network may continue to exchange uplink and/or downlink data using the reconfigured bearer. Desynchronization of the split bearer may thus be avoided.

FIGS. 14-17 illustrate potential specification changes associated with network-initiated recovery operations, according to some embodiments. Note that the illustrated changes are examples and alternative or additional changes may be used.

As shown in FIG. 14, an option to trigger PDCP recovery operations (e.g., recoverPDCP) may be added to a control message (e.g., an RRCreconfiguration message) and/or an information element (IE) to add or modify a bearer (e.g., a data radio bearer (DRB)). Thus, the control message may allow the network to use the recovery configuration (e.g., trigger PDCP recovery) in a flexible way.

As shown in FIG. 15, an option to trigger RLC re-establishment (e.g., reestablishRLC) may be added to a control message and/or an IE regarding RLC and/or bearer configuration.

As shown in FIGS. 16-17 (FIG. 17 is a continuation of FIG. 16), an option to trigger PDCP recovery operations (e.g., PDCPrecover or recoverPDCP) may be added a control message and/or an IE regarding PDCP configuration.

The changes illustrated in FIGS. 14-17 may allow a network to provide the PDCP recovery and/or RLC reestablishment configuration. Further, a note may be added to specification documents to indicate the allowance. For example, a network may explicitly indicate enhanced primary path switching, e.g., using the IE of FIGS. 16-17. In response to such an indication, the UE may: perform the primary leg change, reestablish the RLC entity of the previous primary leg, and/or trigger the PDCP recovery procedure, according to some embodiments.

FIGS. 18-24—UE Initiated Recovery Operations

In some embodiments, a UE may autonomously perform a recovery operation, e.g., without an explicit indication from the network. For example, when one or more of the following conditions is fulfilled (e.g., in addition to determining that a packet was not positively acknowledged by the network), a UE may perform recovery operations (e.g., PDCP recovery). Further, the UE may optionally indicate the recovery operation to the network. Example conditions for performing recovery operations include:

Condition 1: a UE may perform recovery operations upon receiving an indication of primary path switching, e.g., if the UE also determines that a packet was not received by the network.

Condition 2: a UE may perform recovery operations if the radio quality of one leg is worse than a threshold, e.g., if the UE also determines that a packet was not received by the network.

Condition 3: a UE may perform recovery operations if an RLC transmission failure count and/or rate reaches a threshold. Such a threshold may be a lower threshold than a threshold for triggering link failure.

The conditions for recovery operations may be configured explicitly by the network and/or defined in standards.

The (e.g., optional) UE reporting of autonomous recovery operations may be via L3 (e.g., RRC) and/or L2 (e.g., PDCP, MAC) messaging. Such a report may indicate the reestablished RLC entity, suspension of an RLC entity, and/or the flushed RLC SN. An RRC message may be used, for example, when a UE receives the primary path switching configuration (e.g., condition 1). The UE may indicate the recovery information to the network via the reconfiguration complete message. In other words, an RRC reconfiguration message may be sent and the indication of the recovery operation may be piggybacked in the RRC message. An L2 message may carry the indication in one or more PDCP, MAC, and/or RLC packet(s).

Upon the network receiving the indication, the network may re-establish the corresponding RLC entity and/or mark the flushed RLC SN as received packet. More generally, in response to an indication of the UE's recovery operation, the network may adjust/update its RLC (and/or other) entities to match those of the UE.

The trigger conditions and network understanding (without an indication from the UE) may be as described in the following table, according to some embodiments.

| Condition to trigger PDCP Recovery | Network interpretation (without UE indication) |
|---|---|
| Condition 1: Upon receiving the primary path switching | Based on receiving the RRCReconfigurationComplete, the network may determine that the UE has performed or will perform the PDCP recovery. |
| Condition 2: Radio Quality < threshold (associated to the measurement event) | Based on receiving the associated measurement report (e.g., or L1 CSI), the network may determine that the UE has performed or will perform the PDCP recovery. |
| Condition 3: RLC Retransimssion Number (<max RLC number) | N/A. Without an indication from the UE, the network may not determine that the UE has performed or will perform the PDCP recovery, according to some embodiments. |

FIGS. 18-21 are communication flow diagrams illustrating examples of the UE autonomously performing recovery operations, according to some embodiments.

Figure 18:
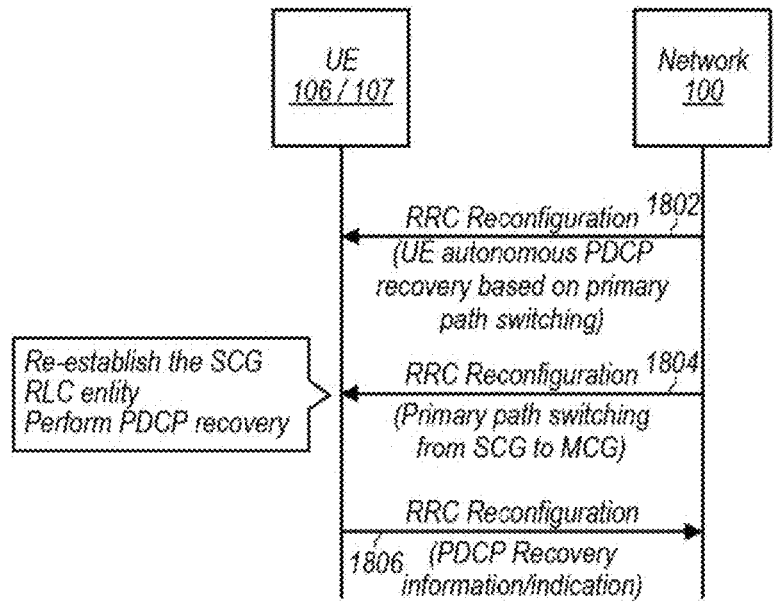
FIGS. 18-24 illustrate aspects of UE initiated recovery operations, according to some embodiments.

FIG. 18 illustrates recovery operations in response to a configuration switching the primary path of a split bearer, according to some embodiments. The network may send a first RRC configuration (or reconfiguration) message (1802) indicating that the UE may autonomously perform recovery in response to a primary path change (e.g., if any packets have not been acknowledged). The network may signal a path switch (e.g., from SCG to MCG) for a split bearer (1804). In response to the path change and a determination of an unacknowledged uplink transmission, the UE may autonomously perform a recovery operation, re-establish the RLC entity (e.g., from the SCG to the MCG), and retransmit the transmission (e.g., using the new primary path). The UE may further send a message indicating the recovery operation, e.g., in an RRC reconfiguration complete message (1806).

Figure 19:
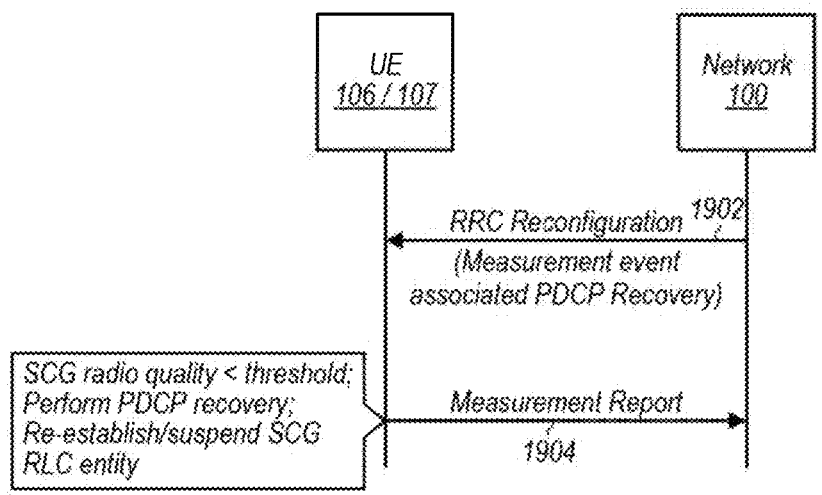

FIG. 19 illustrates recovery operations in response to a measurement event, according to some embodiments. The network may send a first RRC configuration (or reconfiguration) message (1902) indicating that the UE may autonomously perform recovery in response to one or more measurement below a threshold (e.g., if any packets have not been acknowledged). The network may further configure the measurements and/or the threshold, e.g., with regard to the type and/or timing of measurements, hysteresis, value of the threshold, etc. The UE may perform measurements according to the configuration. In response to the measurement threshold being reached (e.g., radio conditions of the primary path, e.g., the SCG, meeting the threshold condition, e.g., being poor enough for autonomous recovery operations) and a pending uplink transmission being unacknowledged, the UE may autonomously perform a recovery operation, re-establish and/or suspend the RLC entity, and retransmit the transmission (e.g., using a different path). The UE may further send a measurement report (1904). Based on the measurement report, the network may determine that PDCP recovery conditions were satisfied. Thus, the network may update PDCP and/or RLC entities to correspond to changes by the UE. In some embodiments, the UE may further send a message indicating the recovery operation and/or specifying further detail about the recovery operations.

Figure 20:
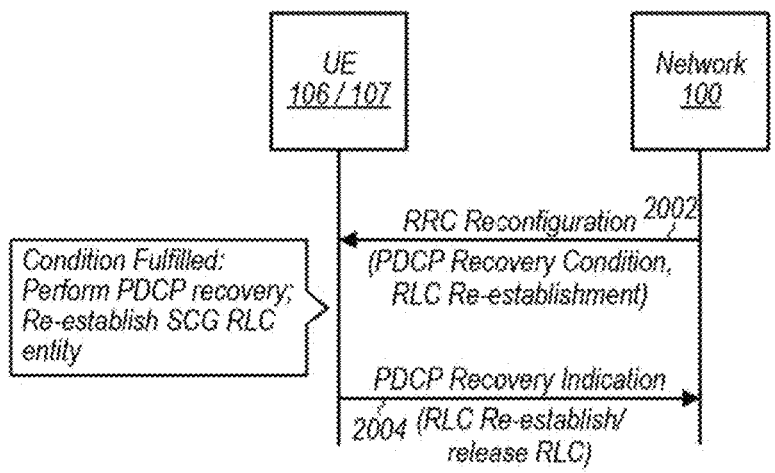

FIG. 20 illustrates recovery operations in response to a recovery condition being satisfied and RLC re-establishment being indicated, according to some embodiments. The network may send a first RRC configuration (or reconfiguration) message (2002) indicating that the UE may autonomously perform recovery in response to a (e.g., specified) recovery condition being satisfied (e.g., if any packets have not been acknowledged). The configuration message may further indicate that the UE may re-establish an RLC entity if the condition is satisfied. Subsequently, the UE may determine that the condition is fulfilled. e.g., according to the configuration and/or other information. In response to the condition being fulfilled and a pending uplink transmission being unacknowledged, the UE may autonomously perform a recovery operation, re-establish and/or suspend the RLC entity, and retransmit the transmission (e.g., using a different path). The UE may further send a message indicating the recovery operation (2004). The UE may further indicate specifics of the recovery operation, e.g., that an RLC entity was re-established and/or released. Thus, the network may update PDCP and/or RLC entities to correspond to changes by the UE.

Figure 21:
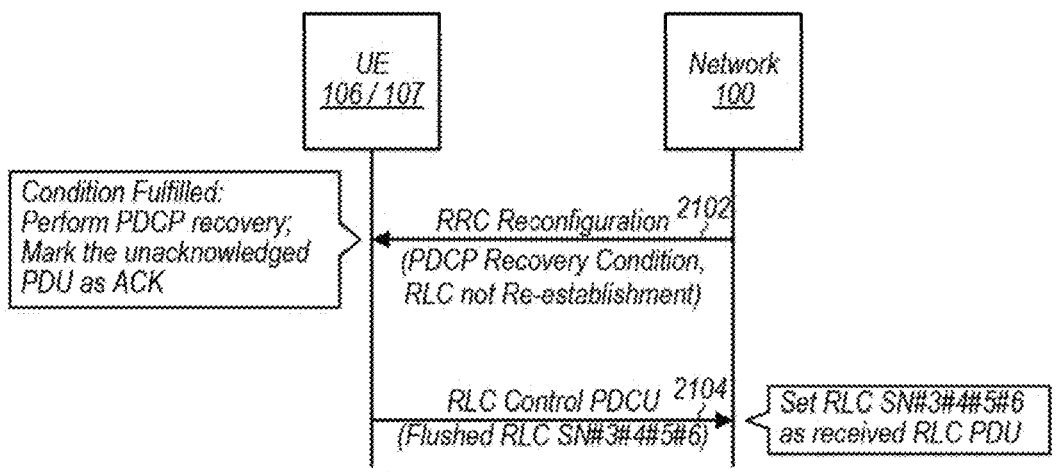

FIG. 21 illustrates recovery operations in response to a recovery condition being satisfied and RLC re-establishment not being indicated, according to some embodiments. The network may send a first RRC configuration (or reconfiguration) message (2102) indicating that the UE may autonomously perform recovery in response to a (e.g., specified) recovery condition being satisfied (e.g., if any packets have not been acknowledged). The configuration message may further indicate that the UE may not re-establish an RLC entity if the condition is satisfied. Alternatively, the configuration message may further indicate that the UE may flush any unacknowledged packets from an RLC entity if the condition is satisfied. Subsequently, the UE may determine that the condition is fulfilled, e.g., according to the configuration and/or other information. In response to the condition being fulfilled and a pending uplink transmission being unacknowledged, the UE may autonomously perform a recovery operation, flush the RLC entity, and retransmit the transmission (e.g., using a different path). Flushing the RLC entity may include treating or marking any unacknowledged packets as if they were acknowledged. Thus, the RLC entity may cease any further attempts to retransmit the flushed packets. The UE may further send a message indicating flushed packets (2104). The network may update its RLC entity to correspond to changes by the UE. For example, the network may treat the flushed packets (e.g., the SN values) as if they were received. In other words, the network may update any timers (e.g., T-reordering) and/or reordering/push windows as if the flushed packets were received. The UE may further retransmit the flushed packets. e.g., using new SN values.

Figure 22:
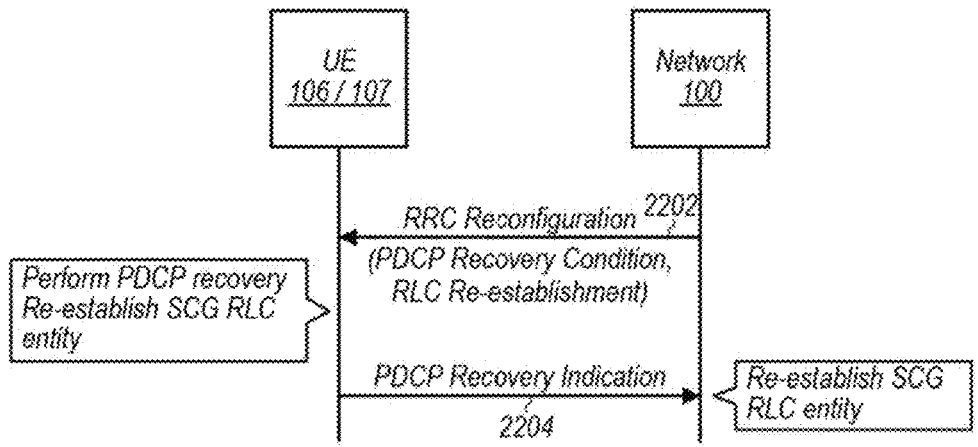
Figure 23:
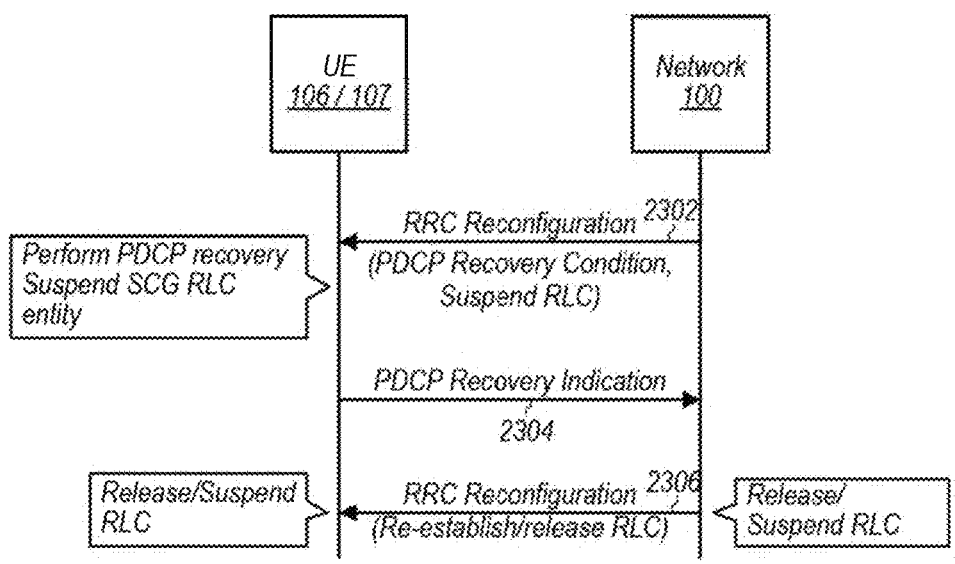
Figure 24:
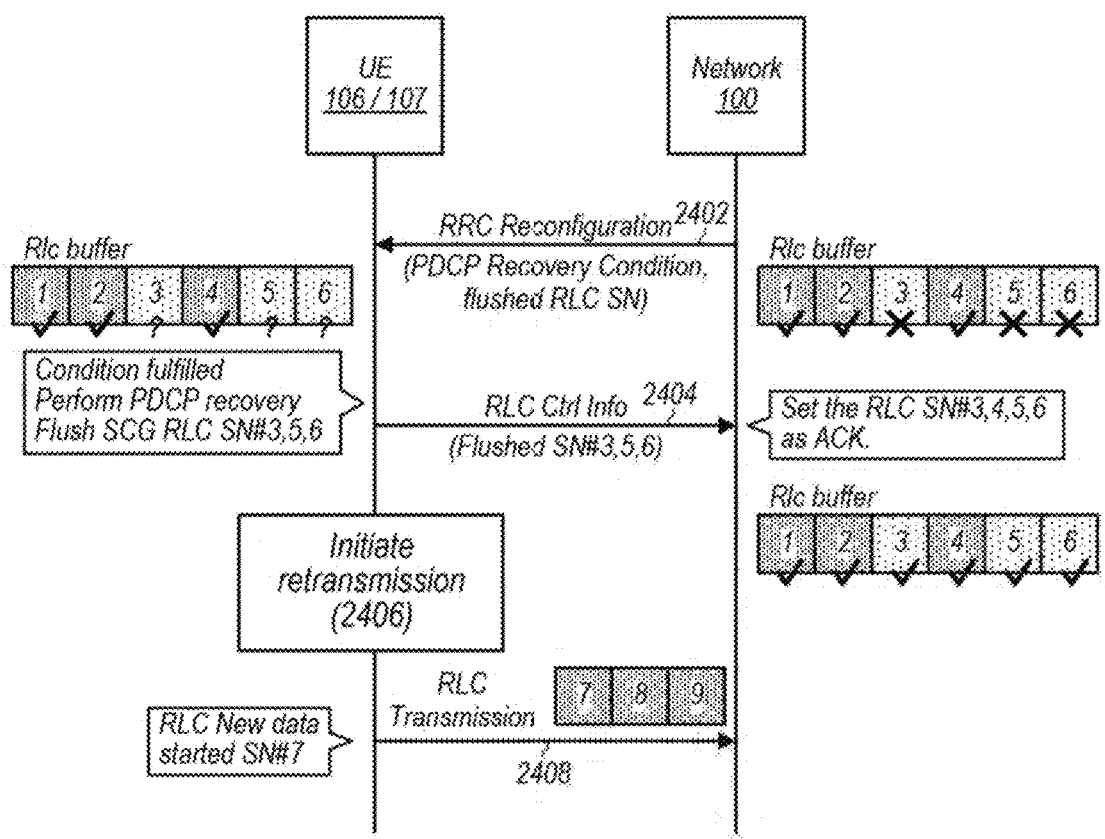

FIGS. 22-24 are communication Row diagrams illustrating examples of the UE autonomously performing recovery operations, including illustration of possible RLC operations. Various options for RLC operations associated with recovery operations are described below. The network may configure which option(s) may be performed by the UE and/or may configure conditions for selecting any particular option(s), according to some embodiments.

According to a first option, an associated RLC may be re-established with PDCP recovery. For example, a UE may reset an RLC variable upon performing the RLC re-establishment. In other words, the next transmitted packet may be provided with SN #0.

FIG. 22 illustrates this first option, according to some embodiments. The network may transmit RRC configuration (or reconfiguration) information to the UE (2202). The information may indicate a condition (or set of conditions) for recovery operations. The information may further indicate that RLC should be (or may be) re-established if the recovery condition(s) is met. The UE may (e.g., later) determine that the condition is met, and in response may perform recovery operations and re-establish an RLC entity. For example, the UE may re-establish an RLC entity previously associated with the SCG as an MCG-associated RLC entity. The UE may provide a recovery indication to the network (2204). In response, the network may re-establish a corresponding RLC entity. The network may determine how to re-establish the RLC entity based on the control information and/or based on information provided with the recovery indication.

According to a second option, the UE may suspend the associated RLC: with PDCP recovery, e.g., without retransmission. In other words, during suspension of the associated RLC entity, the UE may not perform any transmission (Tx) and/or reception (Rx) operations. For example, for an AM RLC entity, the UE may suspend the entire AM RLC entity and may stop both Rx and Tx for the RLC AM entity. The UE may inform the network of the suspension. The UE may wait for explicit RLC configuration from the network to delete and/or resume the RLC entity. Upon receiving any RLC configuration information, the UE may resume retransmission according to the new configuration.

FIG. 23 illustrates this second option, according to some embodiments. The network may transmit RRC configuration (or reconfiguration) information to the UE (2302). The information may indicate a condition (or set of conditions) for recovery operations. The information may further indicate that RLC should be (or may be) suspended if the recovery condition(s) is met. The UE may (e.g., later) determine that the condition is met, and in response may perform recovery operations and suspend an RLC entity, e.g., the SCG RLC entity in the case that the SCG is the primary path. For example, the UE may temporarily halt retransmission operations for the suspended RLC entity. The UE may provide a recovery indication to the network (2304). In response, the network may determine that the UE has suspended the RLC entity. The network may indicate to the UE to unsuspend (e.g., release and/or re-establish) the RLC entity (2306). The indication may be an RRC reconfiguration message. In some embodiments, the network may further indicate whether the RLC should be released in the previous configuration or re-established in a different configuration (e.g., associated with a different path). In some embodiments, the UE may autonomously determine whether the RLC should be released in the previous configuration or re-established in a different configuration, e.g., based on previous configuration, standards information, and/or an evaluation of specified conditions. The UE and the network may release or suspend the RLC entity accordingly.

According to a third option, no associated RLC re-establishment may be performed together with PDCP recovery. For example, a UE may not re-establish the RLC associated with PDCP recovery, and may regard the unacknowledged RLC PDU as if they were acknowledged (ACK). The UE may rely on PDCP retransmission. The UE may inform the network about the flushed (self-ACK) RLC PDU SN information. Based on receiving the information, the network may set the corresponding RLC PDU as received state, and may move the RLC receiving window accordingly.

FIG. 24 illustrates this third option, according to some embodiments. The network may transmit RRC configuration (or reconfiguration) information to the UE (2402). The information may indicate a condition (or set of conditions) for recovery operations. The information may further indicate that RLC should be (or may be) flushed if the recovery condition(s) is met. The UE may (e.g., later) determine that the condition is met, and in response may perform recovery operations and flush an RLC entity, e.g., the SCG RLC entity in the case that the SCG is the primary path. For example, the UE may treat any unacknowledged packets of the flushed RLC entity as if they are acknowledged (e.g., SN 3, 5, and 6 in the figure). The UE may provide an indication to the network (2404), e.g., specifying the flushed SN values. In response, the network may determine that the UE has flushed the RLC entity. The network may treat the indicated SNs as if they have been acknowledged and may reset any timers and/or receiving windows accordingly. In other words, the network may adjust the RLC buffer so that SN 3, 5, and 6 are treated as received and acknowledged. The UE (e.g., the UE's PDCP layer) may initiate a retransmission of the packets (2406). The UE (e.g., the RLC layer) may retransmit the packets, e.g., with new SN values 7-9 (2408). The RLC layer may treat the packets as new packets.

In some embodiments, additional conditions may be associated with the different options. For example, a first condition may be indicated for the recovery operations. Additionally, distinct secondary conditions may be indicated for each of the options for RLC operations. For example, if the first condition is satisfied, the UE may determine which of various secondary conditions is satisfied. Based on the determination of the secondary conditions, the UE may select and perform a corresponding option of the RLC operations.

Additional Information and Embodiments

Although the embodiments described above have been primarily described with respect to split bearers, it will be appreciated that other types of bearers and/or paths are envisioned as well, according to some embodiments. For example, the method of FIG. 5 may be applied in cases where a (e.g., non-split) bearer is reconfigured to use a different or changed path.

In a first set of embodiments, a user equipment device (UE), may comprise: a radio; and a processor operably connected to the radio and configured to cause the UE to: establish communication with a cellular network via a split bearer, transmit, to the network via the split bearer, a plurality of packets, wherein to transmit the plurality of packets via the split bearer comprises using a packet data convergence protocol (PDCP) entity associated with the split bearer; receive, from the cellular network, an indication to recover the PDCP entity associated with the split bearer, and in response to the indication to recover the PDCP entity associated with the split bearer: perform a PDCP recovery procedure; and retransmit at least one packet of the plurality of packets.

In some embodiments, the plurality of packets is transmitted via a first cell group, wherein the at least one packet of the plurality of packets is retransmitted with a second cell group.

In some embodiments, transmitting the plurality of packets comprises tracking the plurality of packets with a radio link control (RLC) entity associated with the first cell group, wherein, in response to the indication to recover the PDCP entity associated with the split bearer. the processor is further configured to cause the UE to reestablishing the RLC entity in association with the second cell group.

In some embodiments, reestablishing the RLC entity in association with the second cell group comprises flushing sequency numbers of the RLC entity.

In some embodiments, the indication to recover the PDCP entity associated with the split bearer comprises a radio resource control (RRC) reconfiguration message.

In some embodiments, the indication to recover the PDCP entity associated with the split bearer comprises a flag in a PDCP configuration of the RRC reconfiguration message.

In some embodiments, the indication to recover the PDCP entity associated with the split bearer comprises a flag in a radio link control (RLC) configuration of the RRC reconfiguration message.

In a second set of embodiments, an apparatus may comprise a processor configured to cause a user equipment device (UE) to: establish communication with a cellular network; receive, from the cellular network, control information configuring a split bearer, transmit a plurality of packets to the cellular network via the split bearer; determine that a condition for performing a packet data convergence protocol (PDCP) recovery is satisfied; in response to the determination that the condition for performing the PDCP recovery is satisfied; perform the PDCP recovery; and retransmit a first packet of the plurality of packets.

In some embodiments, the condition comprises an indication from the cellular network to switch from a first primary leg to a second primary leg for the split bearer.

In some embodiments, the condition comprises a determination that a radio quality associated with a primary leg of the split bearer is less than a threshold.

In some embodiments, the condition comprises a determination that a transmission failure threshold is reached.

In some embodiments, in response to the determination that the condition for performing the PDCP recovery is satisfied, the processor is further configured to cause the UE to transmit, to the network, an indication of the PDCP recovery.

In some embodiments, in response to the determination that the condition for performing the PDXP recovery is satisfied, the processor is further configured to cause the UE to re-establish a radio link control (RLC) entity, wherein the indication of the PDCP recovery comprises an indication of the re-established RLC entity.

In some embodiments, in response to the determination that the condition for performing the PDCP recovery is satisfied, the processor is further configured to cause the UE to flush a radio link control (RLC) entity, wherein the indication of the PDCP recovery comprises an indication of a sequence number of the first packet of the plurality of packets.

In a third set of embodiments, a method may comprise, at a base station of a cellular network: establishing communication with a user equipment device (UE); transmitting, to the UE, configuration information for a split bearer, wherein the configuration information identifies a first primary leg for the split bearer, receiving, from the UE, a first packet via the first primary leg; determining, based on the first packet, that a second packet was not received; in response to the determination that the second packet was not received, transmitting, to the UE, an indication to reconfigure the split bearer, wherein the indication to reconfigure the split bearer identifies a second primary leg for the split bearer, wherein the indication to reconfigure the split bearer includes an indication to recover the second packet; and receiving, from the UE, the second packet via the second primary leg.

In some embodiments, the method may be further comprising: starting a reordering timer in response to the determination that the second packet was not received; maintaining the reordering timer while the split bearer is reconfigured; and stopping the reordering timer in response to receiving the second packet via the second primary leg.

In some embodiments, the indication to recover the second packet comprises a packet data convergence protocol (PDCP) recovery flag.

In some embodiments, the indication to recover the second packet comprises a radio link control (RLC) reestablishment flag.

In some embodiments, the configuration information for the split bearer indicates that data recovery is enabled.

In some embodiments, the method may be further comprising: reestablishing an radio link control (RLC) entity in response to the determination that the second packet was not received.

In various embodiments, various combinations of the adaptations described above may be performed together. For example, the network may send control information to a UE to cause the UE to process downlink RS according to embodiments discussed above and to transmit uplink RS according to embodiments discussed above.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs.

Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
at a base station of a cellular network:
establishing communication with a user equipment device (UE);
transmitting, to the UE, configuration information for a split bearer, wherein the configuration information identifies a first primary leg for the split bearer;
receiving, from the UE, a first uplink packet via the first primary leg;
determining, based on the first uplink packet, that a second uplink packet was not received;
in response to the determination that the second uplink packet was not received, transmitting, to the UE, an indication to reconfigure the split bearer, wherein the indication to reconfigure the split bearer identifies a second primary leg for the split bearer, wherein the indication to reconfigure the split bearer includes an indication to recover the second uplink packet; and
receiving, from the UE, the second uplink packet via the second primary leg.

2. The method of claim 1, further comprising:
starting a reordering timer in response to the determination that the second uplink packet was not received;
maintaining the reordering timer while the split bearer is reconfigured; and
stopping the reordering timer in response to receiving the second uplink packet via the second primary leg.

3. The method of claim 1, wherein the indication to recover the second uplink packet comprises a packet data convergence protocol (PDCP) recovery flag.

4. The method of claim 1, wherein the indication to recover the second uplink packet comprises a radio link control (RLC) reestablishment flag.

5. The method of claim 1, wherein the configuration information for the split bearer indicates that data recovery is enabled.

6. The method of claim 1, further comprising:
reestablishing an radio link control (RLC) entity in response to the determination that the second uplink packet was not received.

7. A method, comprising:
establishing communication with a base station of a cellular network;
receiving, from the base station, configuration information for a split bearer, wherein the configuration information identifies a first primary leg for the split bearer;
transmitting, to the base station, a first uplink packet via the first primary leg;
transmitting, to the base station, a second uplink packet;
receiving, from the base station, an indication to reconfigure the split bearer, wherein the indication to reconfigure the split bearer identifies a second primary leg for the split bearer, wherein the indication to reconfigure the split bearer includes an indication to recover the second uplink packet, wherein the indication is responsive to a determination based on the first uplink packet, that the second uplink packet was not received; and
in response to the indication to recover the second uplink packet, retransmitting, to the base station, the second uplink packet via the second primary leg.

8. The method of claim 7, wherein the indication to recover the second uplink packet comprises a packet data convergence protocol (PDCP) recovery flag.

9. The method of claim 7, wherein the indication to recover the second uplink packet comprises a radio link control (RLC) reestablishment flag.

10. The method of claim 7, wherein the configuration information for the split bearer indicates that data recovery is enabled.

11. The method of claim 7, further comprising:
reestablishing an radio link control (RLC) entity after receiving the indication to recover the second uplink packet.

12. A baseband processor configured to perform operations, the operations comprising:
establishing communication with a base station of a cellular network;
receiving, from the base station, configuration information for a split bearer, wherein the configuration information identifies a first primary leg for the split bearer;
transmitting, to the base station, a first uplink packet via the first primary leg;
transmitting, to the base station, a second uplink packet;
receiving, from the base station, an indication to reconfigure the split bearer, wherein the indication to reconfigure the split bearer identifies a second primary leg for the split bearer, wherein the indication to reconfigure the split bearer includes an indication to recover the second uplink packet, wherein the indication is responsive to a determination based on the first uplink packet, that the second uplink packet was not received; and
in response to the indication to recover the second uplink packet, retransmitting, to the base station, the second uplink packet via the second primary leg.

13. The baseband processor of claim 12, wherein the indication to recover the second uplink packet comprises a packet data convergence protocol (PDCP) recovery flag.

14. The baseband processor of claim 12, wherein the indication to recover the second uplink packet comprises a radio link control (RLC) reestablishment flag.

15. The baseband processor of claim 12, wherein the configuration information for the split bearer indicates that data recovery is enabled.

16. The baseband processor of claim 12, further comprising:
   reestablishing an radio link control (RLC) entity after receiving the indication to recover the second uplink packet.

* * * * *